United States Patent [19]

Blomenkamp

[11] 3,828,263

[45] Aug. 6, 1974

[54] DEMODULATOR FOR FREQUENCY-BURST-DURATION MODULATED SIGNALS

[75] Inventor: Robert W. Blomenkamp, Palo Alto, Calif.

[73] Assignee: Physics International Company, San Leandro, Calif.

[22] Filed: June 12, 1973

[21] Appl. No.: 369,170

Related U.S. Application Data

[63] Continuation-in-part of Ser. No. 169,988, Aug. 9, 1971, Pat. No. 3,754,215.

[52] U.S. Cl. .............. 329/106, 178/88, 178/5.45 Y, 328/111

[51] Int. Cl. .............................................. H03k 9/08

[58] Field of Search .................... 329/104, 105, 106; 325/326, 338, 340, 424; 178/88, 5.4 SY; 179/84; 340/206; 328/111

[56] References Cited

UNITED STATES PATENTS

| | | | |
|---|---|---|---|
| 2,907,930 | 10/1959 | Wyndham | 329/104 X |
| 3,286,200 | 11/1966 | Foulger | 328/111 X |
| 3,730,982 | 5/1973 | Niimi et al. | 178/5.4 SY |
| 3,754,215 | 8/1973 | Blomenkamp | 329/106 |

*Primary Examiner*—Alfred L. Brody
*Attorney, Agent, or Firm*—Lindenberg, Freilich, Wasserman, Rosen & Fernandez

[57] ABSTRACT

A demodulator for frequency-burst-duration modulated signals is disclosed comprising a full-wave rectifier and a filter capacitor coupled to an input band-pass filter. A differential amplifier connected to the filter capacitor produces an output signal of predetermined amplitude while a charge is stored in the capacitor above a predetermined minimum. A field-effect transistor shunts the filter capacitor until the rectifier produces a voltage output which tends to charge the capacitor in response to a frequency burst, and again shunts the capacitor for fast discharge at the end of a frequency burst.

12 Claims, 2 Drawing Figures

PATENTED AUG 6 1974 3,828,263

DEMODULATOR FOR FREQUENCY-BURST-DURATION MODULATED SIGNALS

BACKGROUND OF THE INVENTION

This invention relates to a demodulator for a communication system used to transmit analog data from sensors at a remote station to a central station as disclosed in my copending application Ser. No. 169,988, filed Aug. 9, 1971, now U.S. Pat. No. 3,754,215, titled "Frequency-Burst-Duration Modulation and Frequency Multiplexed Data Transmission System" of which this application is a continuation-in-part, subtractive, and more particularly to a demodulator for frequency-burst-duration modulated signals.

In the aforesaid copending application, sensors at a remote station modulate the duration of tone signals transmitted simultaneously over a single frequency-division-multiplex (FDM) communications channel. The duration of each tone is controlled to be proportional to the amplitude of an analog signal from a different one of the sensors, hence the term "frequency-burst-duration modulation." At a central station, a bank of filters receives the FDM tone signals and separates them into separate channels for demodulation.

The demodulation required in each channel must be accomplished by a circuit which will produce from a frequency burst a signal proportional to the duration of the frequency burst with a minimum of error due to rise and fall times within the circuit. One novel demodulating circuit is disclosed in the aforesaid copending application. That novel circuit, and a second improved circuit described herein, is the subject matter which is regarded as the invention in this application.

SUMMARY OF THE INVENTION

A tone signal of duration proportional to the amplitude of an analog signal from a sensor is demodulated by apparatus comprising means for rectifying the tone signal and a capacitor for filtering the output of the rectifying means. Amplifying means connected to the capacitor produces an output signal of predetermined amplitude while a charge is stored in the capacitor above a set minimum level. Shunting means connected in parallel with the capacitor provides a low discharge path for the capacitor while the output of the rectifying means is below the set minimum level of the amplifying means, thereby maintaining the capacitor discharged until a tone burst is detected, and rapidly discharging the capacitor to below the set minimum level when the tone signal terminates. Integrating means connected to the output of the amplifying means produces an output signal indicative of the duration of the tone signal.

In one embodiment, the rectifier is a full-wave diode-bridge rectifier which provides a discharge path for the capacitor through to forward biased diodes in series when a tone burst terminates. The shunting means connected to the capacitor is comprised of a field-effect transistor having the drain connected to one side of the capacitor through a first resistor and a gate connected to the same side of the capacitor through a second resistor. The source electrode of the transistor is connected to the other side of the capacitor where the one side and the other side of the capacitor are selected for connection to the field-effect transistor to provide a high source-to-gate bias voltage proportional to the charge stored in the capacitor, whereby as the capacitor discharges through the series connected diodes of the rectifier at the end of a tone burst, the field-effect transistor will conduct. As the current through the field-effect transistor decreases exponentially with a decrease of charge stored in the capacitor, current through the field-effect transistors increases, thereby providing a faster and more linear discharge of the capacitor once discharge through the diode bridge commences.

In a second embodiment, the rectifier may be an active full-wave rectifier comprising an operational amplifier and two oppositely poled feedback diodes. The output of the rectifier is coupled to the main filter capacitor through a low-pass partial filter comprising an operational amplifier having an RC feedback circuit. The shunting means is comprised of a transistor having its input and output terminals connected directly to respective first and second sides of the filter capacitor. Bias voltage for the control terminal of the transistor is provided by amplifying means having its input terminal connected to a voltage dividing network connected in parallel with a series circuit comprising a current limiting resistor, a unidirectional current conducting means and the filter capacitor. In the absence of a signal across the voltage dividing network, the bais amplifying means turns the shunting field-effect transistor on. In that manner, the capacitor is fully shunted except while a signal is provided across the voltage dividing network above a set minimum level. The low-pass filter coupling the rectifier to the capacitor prevents transients from turning the shunting transistor off. The feedback signal in the active low-pass filter is employed to control the gain coupling the input frequency burst signal to the rectifier, thereby making the demodulator more sensitive to initial cycles of a tone burst for faster and more positive rise in the main filter capacitor.

The novel features that are considered characteristic of this invention are set forth with partcularity in the appended claims. The invention will best be understood from the following description when read in connection with the accompanying drawings.

DESCRIPTION OF THE PREFERRED EMBODIMENTS

Figures 1, 2:
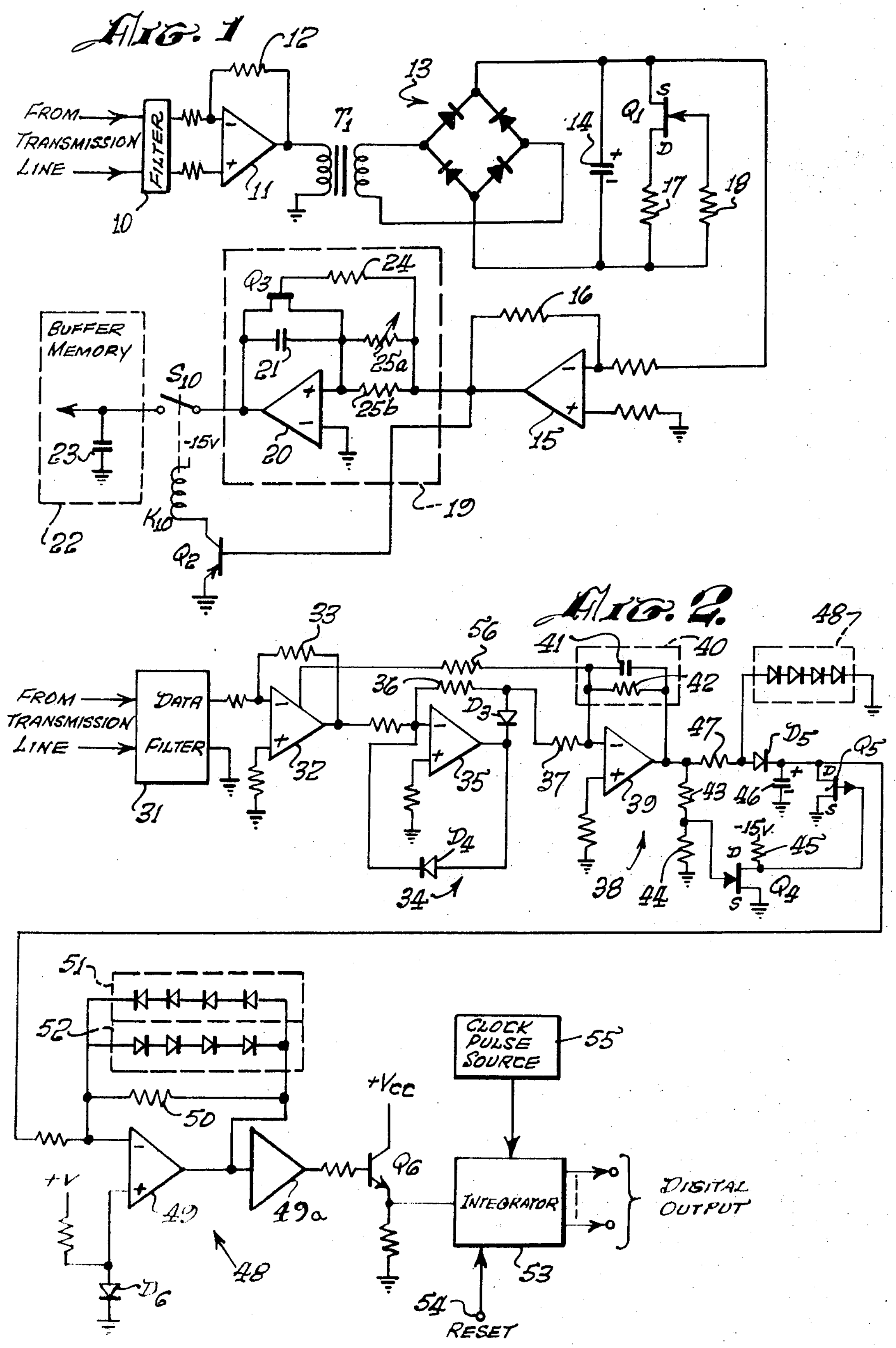
FIG. 1 is a circuit diagram of a first embodiment of the invention.
FIG. 2 is a circuit diagram of a second embodiment of the invention.

In the following description of preferred embodiments, it is to be understood that a remote sensor station transmits analog sensor data to a central station in the form of duration-modulated, frequency-division-multiplexed tone pulses. These tone pulses are received at the central station through a transmission line, or other communications channel, and coupled to a bank of tuned bandpass filters, such as filter 10 shown in FIG. 1 for demultiplexing one signal channel. There is, therefore, one demultiplexing and demodulating network for each sensor at the central station. All demultiplexing and demodulating circuits are identical except for the input bandpass filter. These networks operate in parallel for independent and simultaneous demultiplexing and demodulation of the duration-modulated tone pulses.

The output of the filter 10 is amplified by an isolating operational amplifier 11 having a feedback resistor 12 coupled to a diode bridge 13 by a transformer $T_1$. A filter capacitor 14, field-effect transistor $Q_1$ and an inverting, high-gain operation amplifier 15 with feedback resistor 16 cooperate to produce a pulse of fixed amplitude from the beginning to the end of a sensor tone burst. The fixed amplitude is set by the gain of the amplifier 15 such that when a charge is stored in the capacitor 14 above a set minimum level, the amplifier 15 is driven to a saturation level. Otherwise it is cut off. This saturation level is tightly controlled and the offset voltage of the amplifier is compensated to reduce it to substantially zero.

The source electrode of the transistor ransistor $Q_1$ is connected to the positive end of the filter capacitor 14 while the drain and gate electrodes are connected to the negative end of the filter capacitor through resistors 17 and 18. The transistor is a junction (N-channel) field-effect transistor so that with little or no charge stored in the capacitor 14, the transistor is biased in a high current state, thus maintaining a low impedance discharge path for any charge which may otherwise tend to accumulate in the capacitor. When a tone pulse is received and rectified by the diode bridge 13, voltage is applied across the capacitor 14. That voltage results in a reverse bias voltage across the PN junction between the source and gate of the transistor, thereby tending to pinch current through the transistor off and allowing the capacitor 14 to charge.

As a charge is accumulated in the capacitor 14, the source-to-gate voltage is further increased until the transistor $Q_1$ is pinched off at a voltage level across the capacitor 14 slightly below the level which will drive the amplifier 15 to saturation. This arrangement provides a fast rise time in the charge across the capacitor since the increasing charge quickly pinches off current through the transistor $Q_1$.

When the tone pulse ends, the transistor $Q_1$ is still pinched off by the charge stored in the capacitor 14, but that charge may immediately begin to discharge through the base-emitter junction of a junction transistor at the input stage of the amplifier 15, or the base-emitter junction of an emitter-follower stage coupling the capacitor 14 to the amplifier 15. Still another arrangement might include a large capacitor across the capacitor 14. In any case, the capacitor begins to discharge, but as the capacitor discharges, current begins to decrease exponentially as voltage is decreased due to the exponential I-V characteristic of the base-emitter junction through which the capacitor is discharging. However, the rate of discharge of the capacitor is maintained high even under low charge conditions by conduction of the FET transistor $Q_1$ which begins when the voltage across the capacitor 14 is no longer enough to maintain a gate-source voltage, $V_{GS}$, high enough to hold the FET transistor at pinch off. This action is inherent in the characteristics of drain-current versus drain-source voltage of a field-effect transistor for a varying gate-source voltage. Those characteristics resemble the characteristics of a pentode tube. In that manner, when a tone burst is received, the capacitor quickly charges, thereby increasing the gate-source voltage of the transistor $Q_1$ to the pinch off level. When a tone burst stops, the capacitor begins to discharge. Very soon the capacitor 14 will have discharged sufficiently for the FET transistor $Q_1$ to conduct, and as the gate-source voltage decreases towards zero, drain current through the transistor increases, compensating for exponential decay in the discharge current noted hereinbefore thus providing faster discharge of the capacitor 14 at a desired high rate. The operation of the transistor $Q_1$ does not require current flow through the gate. Consequently, it is evident that an MOS-type transistor may be used in place of the junction type. It is also evident that if the polarity of the full-wave rectifier is changed, a P-channel transistor would be substituted. In either case, the resistor 18 is selected to be larger than the resistor 17, as is the practice, and the resistor 17 is chosen for the compensation desired in the discharge rate. The precise value of the resistor 17 can be calculated, or more simply determined empirically.

Since the operation of the transistor $Q_1$ relies on some initial discharge path for the capacitor 14 through the rectifier, some provision for initial discharge must be provided if a rectifier is used which does not provide a substantial initial discharge of the capacitor. Such an initial discharge path may be provided in the form of a large resistor connected in parallel with the capacitor.

From the foregoing, it is clear that the unique combination of the circuit elements 10 through 18 and the transistor $Q_1$ provides at the output of the amplifier 15 a well defined squarewave of controlled amplitude. The period of a negative squarewave pulse is established by the time duration of the sensor tone burst detected by the rectifier 13 and capacitor 14. This negative squarewave is coupled to an integrator 19 comprised of an operational amplifier 20 and a feedback capacitor 21. Consequently, the capacitor is charged to a level proportional to the duration of the negative pulse from the amplifier 15. That negative pulse is also coupled to the base of a PNP transistor $Q_2$ which is then turned on to energize a relay $K_{10}$ to close a switch $S_{10}$. The switch $S_{10}$ couples the positive ramp signal out of the amplifier 20 into a buffer memory 22 comprised of a storage capacitor 23 for each demodulating channel.

When the switch $S_{10}$ is opened at the end of the squarewave signal from the amplifier 15, the capacitor 23 will have been charged to the peak voltage of the ramp signal from the integrating amplifier 20. Immediately a field-effect (N-channel) transistor $Q_3$ begins to conduct. That transistor is biased to pinch off by the negative pulse from the amplifier 15 during the integration period through a resistor 24. The source electrode connected to the output of the amplifier 20 is driven positive during integration to drive the transistor further into pinch off. A trimming resistor **25*a* in parallel with a coupling resistor 25*b* permits the slope of the integrator to be adjusted. In that manner, the analog integrator 19 converts the duration of the output pulse from the amplifier 15 into a voltage signal proportional to the duration of the tone burst detected by the rectifier 13 and capacitor 14. The buffer memory capacitor 23 stores that voltage until used in some data processing system (not shown) at which time a switch (also not shown) is closed to discharge the capacitor 23.**

It should be noted that the integrator 19 could be a digital integrator mechanized by a counter for accumulating clock pulses from a stable clock pulse source. The squarewave output from the amplifier 15 would then be employed to gate clock pulses from the source to the counter so that at the end of a tone burst, the counter would be storing a count proportional to the duration of the tone burst detected by the rectifier 13 and capacitor 14. In that event, a buffer memory would not be required since the integrating counter is capable of storing in digital form the number of clock pulses accumulated until that information is used in a data processing system, at which time the counter would be reset to zero for use in integrating the next tone pulse from the output of the amplifier 15.

A second embodiment of the invention will now be described with reference to FIG. 2. A bandpass data filter 31 couples a high-gain operational amplifier 32 having a feedback resistor 33 and a control terminal for control of its gain to a communications channel. An active full-wave rectifier 34 comprised of a high-gain operational amplifier 35 and feedback diodes $D_3$ and $D_4$ are employed. The output of the rectifier taken between the diode $D_3$ and a feedback resistor 36 is coupled by a resistor 37 to a low-pass filter 38 comprised of a high-gain operational amplifier 39 and an RC feedback circuit 40 comprised of a capacitor 41 and a parallel resistor 42. The output of the low-pass filter is connected to a voltage divider comprised of resistors 43 and 44.

The output of the voltage divider is connected to the gate of a field-effect (N-channel) transistor $Q_4$ having its source connected to circuit ground and its drain connected to a source of drain bias voltage (−15V) through a load resistor 45. Under those conditions, the transistor $Q_4$ is normally in a high current state when there is not a voltage across the divider, which is when the detector and low-pass filter is not detecting a tone burst. The source electrode of the transistor $Q_4$ is connected to the gate electrode of a field-effect (P-channel) transistor $Q_5$ having its drain connected to circuit ground and its source connected to a filter capacitor 46.

The filter capacitor 46 is connected to the output of the active low-pas filters 38 by a limiting resistor 47 and isolating diode $D_5$. The junction of resistor 47 and diode $D_5$ is connected to circuit ground by diodes 48 to limit the level to which the filter capacitor 46 can be charged. The output of the low-pass filter 38 is positive and the isolating diode is poled for conduction of forward bias current into the filter capacitor 46, i.e., for charging the capacitor with the polarity shown.

If any transient produces a voltage signal at the output of the amplifier 35, the low-pass filter 38 will prevent the capacitor 46 from being charged, but any charge that is received by that capacitor is quickly discharged through the transistor $Q_5$ due to the zero bias voltage on the gates of the transistor $Q_5$ through the transistor $Q_4$. Any transient which produces a voltage signal across the voltage divider of sufficient amplitude to cause the transistor $Q_4$ to be driven to a low conduction state will also cause the transistor $Q_5$ to be driven to a low conduction state, but the transient will not be sufficient in amplitude to produce an output signal from a comparator 48 owing to the filtering action of the main filter capacitor 46. Immediately after the transient subsides, both transistors $Q_4$ and $Q_5$ conduct. In that manner, the partial filtering by the low-pass filter is aided by the main capacitor 46 to prevent the transients from producing any change in the output of the comparator 48.

Once a tone burst is detected by the rectifier 34 and active low-pass filter 38, the transistors $Q_4$ and $Q_5$ are turned off to permit the filter capacitor 46 to be charged. At the end of the tone burst, the output of the low-pass filter 38 will drop, and due to the isolation provided by the diode $D_5$, the output voltage of the divider quickly drops to circuit ground potential to again turn the transistors $Q_4$ and $Q_5$ on. Once the transistor $Q_5$ turns on, the filter capacitor 46 quickly discharges through the transistor $Q_5$. The result is a positive pulse applied to the comparator 48 comprised of an operational amplifier 49, feedback resistor 50, and two parallel branches 51 and 52 of series connected diodes, one branch having four diodes poled in one direction and the other branch having four diodes poled in the other direction in order to provide limiting action on the output of the voltage comparator 48 to ±2.5 volts.

The second (+) input terminal of the voltage comparator is connected to a source of reference voltage which may be circuit ground, but is here a positive voltage of approximately 0.6V provided by a forward biased diode $D_6$ in order to provide a voltage comparator offset from zero sufficiently to compensate for the voltage drop across the diode $D_5$. The output of the voltage comparator 48 is coupled to an integrator 53 by an inverter 49*a* and a transistor $Q_6$. The integrator is shown to be a digital integrator, but may be an analog integrator as in the case of the first embodiment. The integrator is reset via a terminal 54 by the system utilizing the information being received after a tone burst has been received, detected and converted to digital form. Once reset, the integrator is ready to count pulses from a source 55 during the presence of a pulse from the comparator.

The active low-pass filter 38 is not essential, and is here provided between the full-wave rectifier 34 and filter capacitor 46 in order to provide faster rise time of the comparator 48 and to be able to use a smaller capacitor for the filter capacitor 46. That is made possible by the operational amplifier 39 in the low-pass filter because it can be provided with any desired high gain, i.e., because its selected high gain permits a filter characteristic of desired roll off, such as 6 db per octave. Smaller capacitance for the filter capacitor 46 permits a shorter rise time in charging it. Another advantage of having an active low-pass filter is that the feedback circuit 40 provides a signal which may be fed back to the input operational amplifier 32 via resistor 56 to control its gain such that the demodulating circuit is made more sensitive until a tone burst is detected, at which time the gain of the amplifier 32 is reduced.

Although the present invention has been described in connection with particular exemplary embodimnets, it is to be understood that additional embodiments and modifications will be obvious to those skilled in the art. Consequently, it is intended that the claims be interpreted to cover such embodiments and modifications.

The embodiments of the invention in which an exclusive property or privilege is claimed are defined as follows:

1. In a system for transmission of analog data in the form of a tone signal of duration proportional to the amplitude of an analog signal from a sensor, apparatus for demodulating said tone signal comprising means for rectifying said tone signal, a capacitor for filtering the output of said rectifying means, amplifying means connected to said capacitor for producing at an output terminal thereof a signal of predetermined amplitude while a charge is stored in said capacitor above a set minimum level, and means in parallel with said filter capacitor for automatically discharging said filter capacitor to below said set minimum level while said tone signal is not present, and for permitting said capacitor to charge the moment said tone signal is detected by said rectifying means.

2. The combination of claim 1 wherein said means for discharging said filter capacitor includes a field-effect transistor having a source, a drain, and a gate, said transistor being connected with its source drain circuit in parallel with said capacitor, said source being connected to one side of said capacitor and said drain and gate being connected to the other side of said capacitor, where said one side is selected of a polarity which provides a high source-gate voltage to bias current through said source drain circuit to a level inversely proportional to the source-gate voltage.

3. The combination of claim 2 wherein said rectifying means is comprised of a diode bridge connected directly in parallel with said capacitor, and said discharging means includes means for providing initial discharge current for said capacitor such that, upon termination of said tone burst, high initial discharge current from said capacitor is provided.

4. The combination of claim 3 including means for integrating said output signal for the period of said output signal thereby producing an output proportional to the duration of said tone burst.

5. The combination of claim 1 wherein said means for discharging said filter capacitor includes a transistor having input and output terminals and a control terminal, said transistor having its input terminal connected to one side of said capacitor and its output terminal connected to the other side of said input terminal to provide a direct discharge path for said capacitor while a control voltage at said control terminal biases said transistor into a high current state, a unidirectional conducting means coupling said rectifying means to said filter capacitor, a voltage dividing means connected in parallel with said unidirectional conducting means and filter capacitor in series, said voltage dividing means having an output terminal, and means connected between said output terminal of said voltage dividing means and said control electrode of said transistor to bias said transistor into a high current state when the output of said voltage divider is below said set minimum level.

6. The combination of claim 5 including means for integrating said output signal for the period of said output signal thereby producing an output proportional to the duration of said tone burst.

7. The combination of claim 6 wherein said integrating means provides said output in digital form representing a number proportional to the duration of said tone burst.

8. The combination of claim 1 including an active low-pass filter coupling said rectifying means to said filtering capacitor, said low-pass filter comprising a high-gain operational amplifier having a feedback resistor and capacitor in parallel between input and output terminals thereof.

9. The combination of claim 8 including an input amplifier coupling said tone signal to said filtering means, said input amplifier comprising a high-gain operational amplifier and a feedback resistor between input and output terminals thereof, said operational amplifer having a gain control terminal for voltage control of said gain, and a resistor connected between said gain control terminal of said input amplifer and a junction between said input terminal of said low-pass filter amplifier and said feedback resistor and capacitor of said low-pass filter.

10. The combination of claim 9 wherein said rectifying means is an active full-wave rectifier comprising a high-gain operational amplifier having two unidirectional current paths between output and input terminals thereof, one of said two paths having a diode poled for current of one polarity and the other of said two paths having a diode poled for current of the other polarity and a feedback resistor in series, and wherein the output of said full-wave rectifier is derived from a junction between said diode and resistor in the other of said two paths.

11. The combination of claim 10 wherein said means for discharging said filter capacitor includes a transistor having input and output terminals and a control terminal, said transistor having its input terminal connected to one side of said capacitor and its output terminal connected to the other side of said input terminal to provide a direct discharge path for said capacitor while a control voltage at said control terminal biases said transistor into a high current state, a unidirectional conducting means coupling said rectifying means to said filter capacitor, a voltage dividing means connected in parallel with said unidirectional conducting means and filter capacitor in series, said voltage dividing means having an output terminal, and means connected between said output terminal of said voltage dividing means and said control electrode of said transistor to bias said transistor into a high current state when the output of said voltage divider is below said set minimum level.

12. The combination of claim 11 including means for integrating said output signal for the period of said output signal thereby producing an output proportional to the duration of said tone burst.

* * * * *